United States Patent
Deissler (10) Patent No.: US 11,874,450 B2
(45) Date of Patent: Jan. 16, 2024

(54) OBLIQUE PLANE MICROSCOPE FOR IMAGING A SAMPLE

(71) Applicant: Leica Microsystems CMS GmbH, Wetzlar (DE)

(72) Inventor: Benjamin Deissler, Butzbach (DE)

(73) Assignee: LEICA MICROSYSTEMS CMS GMBH, Wetzlar (DE)

(*) Notice: Subject to any disclaimer, the term of this patent is extended or adjusted under 35 U.S.C. 154(b) by 365 days.

(21) Appl. No.: 17/221,874

(22) Filed: Apr. 5, 2021

(65) Prior Publication Data

US 2021/0318530 A1 Oct. 14, 2021

(30) Foreign Application Priority Data

Apr. 9, 2020 (EP) .................................. 20169056

(51) Int. Cl.
*G02B 21/00* (2006.01)
*G02B 21/36* (2006.01)
*G02B 27/28* (2006.01)

(52) U.S. Cl.
CPC ..... *G02B 21/0032* (2013.01); *G02B 21/0048* (2013.01); *G02B 21/0068* (2013.01); *G02B 21/36* (2013.01); *G02B 27/283* (2013.01)

(58) Field of Classification Search
CPC ...... G02B 21/02; G02B 21/006; G02B 21/04; G02B 21/0032; G02B 27/0068; G02B 21/0024; G02B 21/0048; G02B 21/0068; G02B 21/36; G02B 27/283;
(Continued)

(56) References Cited

U.S. PATENT DOCUMENTS 8,582,203 B2    11/2013   Dunsby
2016/0327779 A1 11/2016   Hillman
(Continued)

FOREIGN PATENT DOCUMENTS

DE    102016103182 B4    4/2018

OTHER PUBLICATIONS

Dunsby, C., Optically sectioned imaging by oblique plane microscopy, Optics Express, Dec. 8, 2008, pp. 20306-20316, vol. 16, No. 25.

*Primary Examiner* — Mustak Choudhury
(74) *Attorney, Agent, or Firm* — Patentbar International (57) ABSTRACT

An oblique plane microscope has an objective illuminating a plane of the sample and collecting detection light. A beam splitting system splits the collected detection light into two detection light bundles along two optical paths, respectively. A first intermediate imaging system generates a first intermediate image of the plane in a first intermediate image space. The first intermediate imaging system has a first objective and a first reflecting element in the first intermediate image space and reflecting the first detection light bundle into the first objective. A second intermediate imaging system generates a second intermediate image of the plane in a second intermediate image space. The second intermediate imaging system has a second objective and a second reflecting element positioned in the second intermediate image space and reflecting the second detection light bundle into the second objective. A detection system detects the detection light bundles reflected into the objectives.

15 Claims, 6 Drawing Sheets

(58) Field of Classification Search
CPC ............. G02B 21/0076; G02B 21/361; G02B 21/367; G02F 1/1313; G02F 1/29
See application file for complete search history.

(56) References Cited

U.S. PATENT DOCUMENTS

2019/0129153 A1* 5/2019 Knebel ................ G02B 21/367
2019/0196172 A1* 6/2019 Hillman ............. G02B 21/0052

* cited by examiner

OBLIQUE PLANE MICROSCOPE FOR IMAGING A SAMPLE

RELATED APPLICATIONS

This application claims priority to European Patent Application EP20169056.7, filed Apr. 9, 2020, which is incorporated herein by reference in its entirety.

FIELD OF THE INVENTION

The present invention relates to an oblique plane microscope for imaging a sample.

BACKGROUND OF THE INVENTION

In light sheet microscopy only a thin slice of a sample is illuminated by a so-called light sheet being formed by an illumination light distribution which is approximately planar in the sample region to be imaged. The illuminated slice of the sample, hereinafter simply referred to as illuminated plane, usually has a thickness of a few hundred nanometers to a few micrometers. Thus, light sheet microscopy allows optical sectioning by reducing out-of-focus light. Further, the amount of incident illumination light which may harm sensitive biological samples can be drastically reduced. Light sheet microscopy combines the benefits of widefield fluorescence imaging as in particular faster imaging speed with an optical sectioning capability known from non-widefield approaches as for example confocal imaging.

According to the basic light sheet setup, the sample is illuminated perpendicular to the direction of detection, and two separate objectives are used for illuminating the sample with the light sheet and for detecting the fluorescence light emerging from the illuminated plane, respectively. One particularly useful approach deviating from this basic setup is the so-called oblique plane microscopy (OPM) as described e.g. in the article of Dunsby, "Optically sectioned imaging by oblique plane microscopy", Optics Express Vol. 16, p. 20306 (2008). In OPM, a single objective on the sample side is used for both illumination and detection. This allows access to fluorescence-based microscopic light sheet imaging in samples which cannot be imaged by means of a light sheet microscope according to the basic setup comprising two objectives. Further, a special type of OPM is known as Swept Confocally-Aligned Planar Excitation (SCAPE) microscopy which allows high-speed 3D imaging using an oblique light sheet which is swept through the sample by means of a scanning mirror as described e.g. in DE 10 2016 103 182 B4.

In OPM, the light sheet is emitted into the sample at an oblique angle relative to the optical axis of the objective facing the sample. Therefore, additional optics is used to tilt the focal plane used for detection by the same angle. For this, U.S. Pat. No. 8,582,203 B2 essentially proposes to use two microscopes back to back in order to achieve an optical transport system enabling aberration-free imaging from the sample into an intermediate image space. A third microscope is placed at an oblique angle on the other side of the intermediate space in order to image the illuminated plane onto a detector. Thus, the configuration includes in total three objectives, one of these objectives facing the sample and the other two objectives being oriented obliquely to each other on both sides of the intermediate image space. An inherent disadvantage of this conventional configuration is a limited detection aperture which reduces efficiency in terms of the amount of light collected for detection.

SUMMARY OF THE INVENTION

It is an object to provide an oblique plane microscope for imaging a sample with an increased light collection efficiency.

The afore-mentioned object is achieved by the subject-matter according to claim 1. Advantageous embodiments are defined in the dependent claims and the following description.

According to an embodiment, an oblique plane microscope comprises a single objective which is configured to illuminate a plane of the sample with a light sheet and to collect detection light from the illuminated plane. The oblique plane microscope further comprises a beam splitting system which is configured to split the collected detection light into first and second detection light bundles propagating along first and second optical paths, respectively. The oblique plane microscope comprises a first intermediate imaging system which is configured to generate a first intermediate image of the illuminated plane from the first detection light bundle in a first intermediate image space. The first intermediate imaging system comprises a first objective and a first reflecting element which is positioned in the first intermediate image space and configured to reflect the first detection light bundle back into the first objective. The oblique plane microscope comprises a second intermediate imaging system which is configured to generate a second intermediate image of the illuminated plane from the second detection light bundle in a second intermediate image space. The second intermediate imaging system comprises a second objective and a second reflecting element which is positioned in the second intermediate image space and configured to reflect the second detection light bundle back into the second objective. The oblique plane microscope comprises a detection system which is configured to detect the first and second detection light bundles reflected back into the first and second objectives, respectively, for imaging the sample.

The proposed configuration includes two intermediate imaging systems, each of which comprising an objective and a reflecting element which allow to increase the light collection efficiency when compared to the conventional OPM scheme. Thus, by using a reflecting element for reflecting the detection light back into the objective, the disadvantage of a limited detection aperture occurring in the conventional OPM microscope can be avoided, the latter comprising two objectives being oriented obliquely to each other on both sides of the intermediate image space. Further, the OPM configuration as disclosed herein uses both optical outputs of the beam splitting system so that the entire detection light collected by the single objective can be utilized for imaging the illuminated plane of the sample. In addition, the usage of both optical outputs of the beam splitting system offers the option to separate the detection system in terms of the wavelength of the detection light and/or in terms of the viewing direction.

Preferably, each of the first and second reflecting elements is configured to reflect the respective detection light bundle back into the associated objective such that the reflected detection light bundle is re-centered within a pupil plane of the objective. Re-centering the detection light bundle may be achieved by selecting an angle between a normal axis perpendicular to the respective reflecting element and the optical axis of the objective to be half of an angle between the light sheet illumination and the optical axis of the objective. In particular, the respective reflecting element may be configured to reflect the detection light bundle back into the objective such that an axis perpendicular to the plane which is illuminated by the light sheet is reflected to be parallel to the optical axis of the objective.

The beam splitting system may advantageously be configured to partially overlap the first and second optical paths of the first and second detection light bundles, respectively, into a common detection path. Further, the detection system may comprise an image sensor system which is configured to detect the first and second detection light bundles which are reflected back into the first and second objectives, respectively, and propagate along the common detection path. By overlapping the optical paths, along which the first and second detection light bundles propagate, into a common detection path, a compact optical design can be achieved.

Preferably, the image sensor system comprises a single image sensor which is positioned in the common detection path and configured to detect both the first and second detection light bundles. Using a single image sensor enables a compact design of the detection system.

According to an alternative embodiment, the beam splitting system may be configured to separate the first and second detection light bundles propagating along the common detection path, wherein the image sensor system may comprise a first image sensor configured to detect the first detection light bundle and a second image sensor configured to detect the second detection light bundle. Hence, the detection beam paths are separated from each other and guided onto distinct image sensors. Accordingly, it is not required to precisely overlap the detection beam paths onto a single image sensor.

According to a preferred embodiment, the beam splitting system is configured to separate the first optical path of the first detection light bundle and the second optical path of the second detection light bundle completely. The detection system may comprise a first image sensor configured to detect the first light bundle which is reflected back into the first objective and propagates along the first optical path. The detection system may comprise a second image sensor configured to detect the second light bundle which is reflected back into the second objective and propagates along the second optical path. By completely separating the optical paths of the first and second detection light bundles any problems occurring due to stray light or due to an interference between the optical outputs of the beam splitting system can be avoided.

In a preferred embodiment, the oblique plane microscope comprises a scanner which is configured to scan the light sheet and a focus plane through the sample. In other words, the oblique plane microscope may also be operated according to a SCAPE scheme in order to allow high-speed 3D imaging using an oblique light sheet being swept through the sample by means of the scanner.

The oblique plane microscope may further comprise an illumination system which is configured to emit illumination light onto at least one of the first and second reflecting elements for coupling the illumination light into at least one of the first and second objectives. The illumination light system may comprise a single light source or alternatively two light sources, each of which being assigned to one of the reflecting elements.

Preferably, at least one of the first and second reflecting elements is configured to couple the illumination light into a decentered sub-area of a pupil of the associated objective so that the illumination light enters a decentered sub-area of a pupil of the single objective which illuminates the sample with a light sheet. By decentering the illumination axis, tilting of the light sheet can be suitably adjusted.

According to a specific embodiment, the single objective illuminates the sample with two light sheets from different directions. Further, the first and second reflecting elements may be configured to reflect the first and second detection light bundles into different directions corresponding to the different illumination directions. For this, two separate light sources may be provided, these light sources being controlled to switch the light sheet illumination between different illumination directions. Likewise, two separate image sensors may be utilized for alternatively acquiring the detection light collected from different directions.

According to a preferred embodiment, the beam splitting system comprises at least one polarizing beam splitter which is configured to split the detection light into first and second detection light components having first and second polarization states, respectively. Splitting the detection light depending on its polarization state is efficient with regard to the amount of light which can be collected for detection. Further, splitting can be implemented independently of the wavelength of the detection light.

Preferably, the beam splitting system comprises at least one wave plate associated with the at least one polarizing beam splitter. The wave plate is configured to be transmitted by at least one of said two detection light components twice in opposite light propagation directions thereby altering the polarization state of the detection light component from one of the first and second polarization states into another of the first and second polarization states. Thus, the wave plate can e.g. used to cause the polarization beam splitter to reflect returning detection light which has been transmitted by the beam splitter before and vice versa.

The first and second polarization states may be linear polarization states orthogonal to each other, and the wave plate may be configured to retard the detection light component by a quarter of a wavelength.

Preferably, the oblique plane microscope comprises at least one emission filter which may be configured to block illumination light reflected by the sample. The emission filter may be positioned upstream of the wave plate along an optical path of the detection light component passing through the wave plate for the first time. By locating the emission filter upstream of the wave plate, only a narrow wavelength band must be considered when selecting the characteristics of the wave plate.

Preferably, the illuminated plane is oblique to an optical axis of the first objective, the first intermediate image is oblique to an optical axis of the first objective, and the second intermediate image is oblique to an optical axis of the second objective.

BRIEF DESCRIPTION OF THE DRAWINGS

Hereinafter, specific embodiments are described referring to the drawings, wherein.

DETAILED DESCRIPTION OF THE PREFERRED EMBODIMENTS

Figure 1:
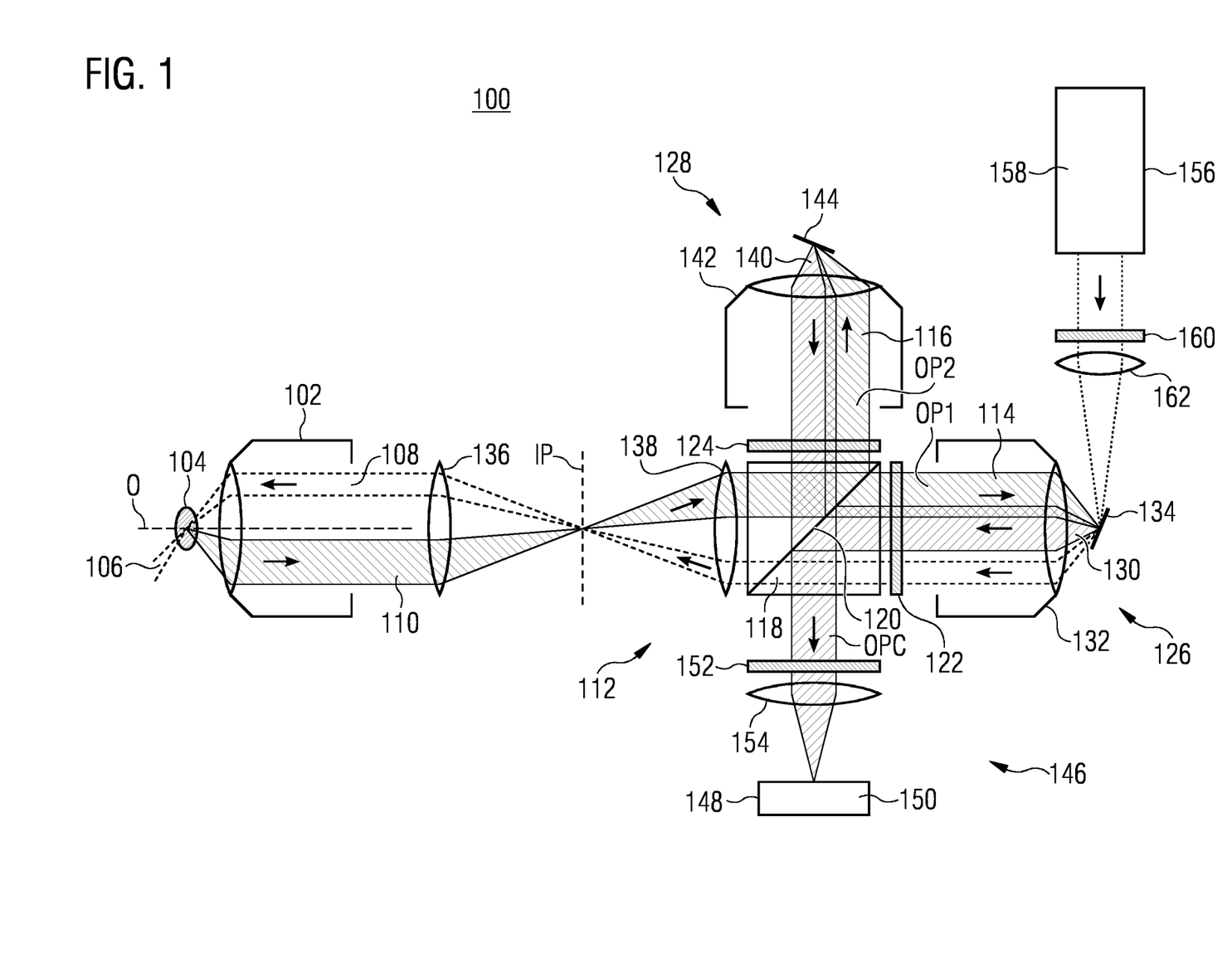
FIG. 1 is a diagram showing an oblique plane microscope according to an embodiment.

FIG. 1 shows a diagram of an oblique plane microscope 100 according to an embodiment. The oblique plane microscope 100 comprises a single objective 102 facing a sample 104 which is to be imaged by means of the oblique plane microscope 100. The objective 102 is configured to illuminate a thin slice of the sample 104 with a light sheet, said illuminated slice approximately defining a plane 106. The light sheet is formed from illumination light 108 which illuminates the objective 102 in a decentered manner as explained below. Specifically, the objective 102 converges the illumination light 108 into the sample 104 along a direction which is tilted relative to an optical axis O of the objective 102. Thus, the light sheet created from the focused illumination light 108 is oriented obliquely relative to the optical axis O of the objective 102.

The objective 102 is further configured to collect detection light 110 in form of fluorescent light which is emitted from the illuminated plane 106. Accordingly, the single objective 102 serves both for detection and illumination.

The oblique plane microscope 100 comprises a beam splitting system 112 which is configured to split the detection light 110 collected by the objective 102 into a first detection light bundle 114 propagating along a first optical path OP1 and a second detection light bundle 116 propagating along a second optical path OP2. According to the embodiment shown in FIG. 1, the beam splitting system 112 comprises a single polarizing beam splitter 118 having a splitting surface 120 for transmitting and reflecting the detection light 110 into two light beams having different linear polarizations, one of which being the transmitted first detection light bundle 114 and the other being the reflected second detection light bundle 116. The polarization states of the first and second detection light bundles 114, 116 may be orthogonal to each other. The beam splitting system 112 further comprises a first quarter-wave plate 122 located in the first optical path OP1 of the transmitted first detection light bundle 114 and a second quarter-wave plate 124 located in the second optical path OP2 of the reflected second detection light bundle 116. Each quarter-wave plate 122, 124 is configured to introduce a controlled phase in the amount of one quarter of the light wavelength between the two polarization light components, thereby altering the polarization of the light.

The beam splitting system 112 including the polarizing beam splitter 118 and the quarter-wave plates 122, 124 provides a first optical output defined by the first optical path OP1 and a second optical output defined by the second optical path OP2. As explained hereinafter, the two optical outputs of the beam splitting system 112 allow to utilize the entire detection light 110 collected by the objective 102 for imaging the illuminated plane 106 of the sample 104. In other words, none of the first and second detection light bundles 114, 116 created by the polarizing beam splitter 118 remains unused for image acquisition. For this, the oblique plane microscope 100 comprises a first intermediate imaging system 126 which is assigned to the first optical output transmitting the first detection light bundle 114 and a second intermediate imaging system 128 which is assigned to the second optical output reflecting the second detection light bundle 116.

The first intermediate imaging system 126 is configured to generate a first intermediate image of the illuminated plane 106 from the first detection light bundle 114 in a first intermediate image space 130. The first intermediate imaging system 126 includes a first objective 132 facing the first intermediate image space 130. The first intermediate imaging system 126 further comprises a first reflecting element 134 which may be formed by a mirror. In order to image the illuminated plane 106 of the sample 104 into the first intermediate image space 130, the first objective 132 cooperates with the single objective 102 facing the sample 104 and two tube lenses 136, 138, which are located between the objective 102 and the beam splitting system 112. Specifically, the tube lens 136 forms the detection light 110 collected by the objective 102 into an auxiliary intermediate image of the illuminated plane 106 which is oblique to an intermediate image plane IP shown in FIG. 1. The detection light 110 is then collected by the tube lens 138 and enters the polarizing beam splitter 118 which transmits the first detection light bundle 114 into the first objective 132. Thus, the first objective 132 creates the first intermediate image of the illuminated plane 106 in the first intermediate image space 130 where the first reflecting element 134 is located.

Similarly, the second intermediate imaging system 128 is configured to generate a second intermediate image of the illuminated plane 106 from the reflected second detection light bundle 116 in a second intermediate image space 140. The second intermediate imaging system 128 includes a second objective 142 facing the intermediate image space 140. The second objective 142 emits the second detection light bundle 116 onto a second reflecting element 144 which is located in the second intermediate image space 140 and may be formed by a mirror. As in the case of the first intermediate imaging system 126, the second objective 142 cooperates with the objective 102 facing the sample 104 and the tube lenses 136, 138 in order to create the second intermediate image of the illuminated plane 106 in the second intermediate image space 140.

The first reflecting element 134 serves to reflect the first detection light bundle 114 back into the objective 132 which emits the detection light bundle 114 onto the first quarter-wave plate 122. Accordingly, the first detection light bundle 114 passes through the first quarter-wave plate 122 twice in opposite directions so that the quarter-wave plate 122 effectively acts as a half-wave plate which rotates linearly polarized light by 90 degrees. Assumed by way of example that the first detection light bundle 114 leaving the polarizing beam splitter 118 is horizontally polarized light, the first detection light bundle 114 becomes vertically polarized light by passing through the quarter-wave plate 122 twice in opposite directions. As a result, the first detection light bundle 114, which has been transmitted through the splitting surface 120 of the polarizing beam splitter 118 before entering the first objective 132, is reflected by the splitting surface 120 when returning from the first reflecting element 134.

Likewise, the second reflecting element 144, which is positioned in the second intermediate image space 140, is configured to reflect the second detection light bundle 116 back into the second objective 142 which emits the second detection light bundle 116 onto the second quarter-wave plate 124. Since the second detection light bundle 116 passes through the second quarter-wave plate 124 twice in opposite directions, the second quarter wave-plate 124 effectively acts as a half-wave plate which rotates linearly polarized light by 90 degrees. Assumed by way of example that the second detection light bundle 116 leaving the polarizing beam splitter 118 is vertically polarized light, the second detection light bundle 116 becomes horizontally polarized light by passing through the quarter-wave plate 124 twice in opposite directions. As a result, the second detection light bundle 116, which has been reflected by the splitting surface 120 of the polarizing beam splitter 118 when entering the beam splitting system 112 for the first time, is now transmitted by the splitting surface 120.

According to the embodiment shown in FIG. 1, the beam splitting system 112 is configured to partially overlap the first and second optical paths OP1, OP2 of the first and second detection light bundles 114, 116 into a common detection path OPC of a detection system 146 which comprises an image sensor system 148. In the example shown in FIG. 1, the image sensor system 148 includes a single image sensor 150 which serves to detect the first and second detection light bundles 114, 116 which are reflected back into the first and second objectives 132 and 142, respectively, and propagate along the common detection path OPC.

The detection system 146 shown in FIG. 1 further comprises an emission filter 152 which blocks the illumination light 108 reflected by the sample 104. Further, the detection system 146 includes a tube lens 154 which directs the first and second detection light bundles 114, 116 onto the single image sensor 150 for imaging the sample 104.

According to the embodiment shown in FIG. 1, the oblique plane microscope comprises an illumination system 156 which includes a light source 158, a quarter-wave plate 160 and a lens 162. The light source 158 emits the illumination light 108 which passes through the quarter-wave plate 160 and the lens 162 to be reflected on the first reflecting element 134 into the objective 132. Subsequently, the illumination light 108 emitted from the first objective 132 passes through the quarter-wave plate 122 and the splitting surface 120 of the polarizing beam splitter 118. Accordingly, the polarizing state of the illumination light 108 is adjusted by the two quarter-wave plates 160 and 122 such that the illumination light 108 is enabled to transmit the splitting surface 120. Then, the illumination light 108 passes through the tube lens 138, 136 and enters the objective 102 which forms the illumination light 108 into the light sheet illuminating the plane 106 of the sample 104. The first reflecting element 134 is configured to couple the illumination light 108 into a decentered sub-area of a pupil of the first objective 132 so that the illumination light 108 enters a decentered sub-area of a pupil of the single objective 102. As a result, the objective 102 is illuminated with the illumination light 108 in a decentered manner, and the light sheet is tilted relative to the optical axis O of the objective 102 in order to illuminate the oblique plane 106 within the sample 104.

As illustrated in FIG. 1, each of the first and second reflecting elements 134, 144 may be configured to reflect the respective detection light bundle 114, 116 back into the associated objective 132, 142 such that the reflected detection light bundle 114, 116 is re-centered within a pupil plane of the objective 132, 142. Re-centering of the detection light bundles 114, 116 relatively to the pupils of the objectives 132, 134 enables a detection aperture used for collecting the detection light to be enlarged compared to a conventional OPM configuration which uses two objectives oriented obliquely to each other on both sides of the intermediate image space. The effect of enlarging the detection aperture is illustrated in FIGS. 2 and 3.

Figure 2:
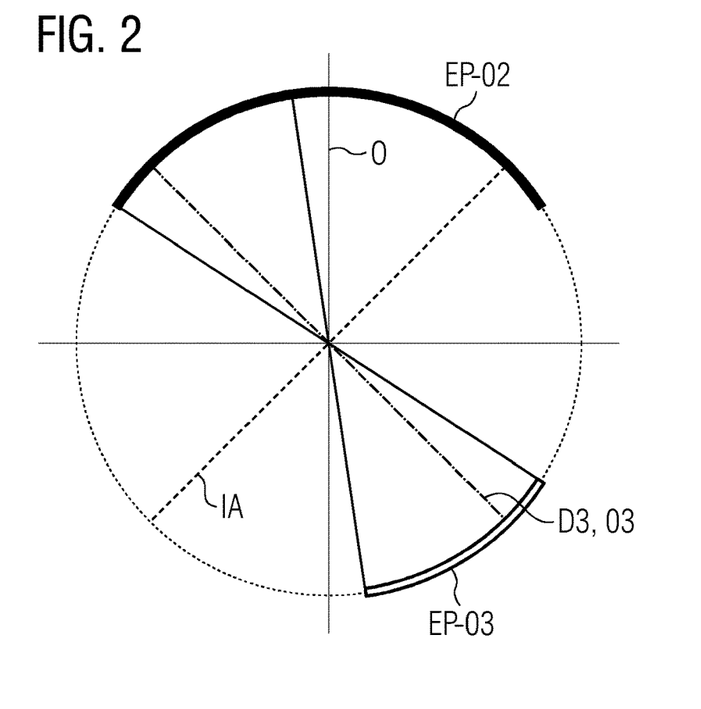
FIG. 2 is a schematic diagram illustrating a limitation of the detection aperture occurring in a conventional configuration.

FIG. 2 is a diagram showing the relationship between the illumination and detection angles and an effective detection aperture in a conventional OPM configuration as disclosed in the aforementioned document U.S. Pat. No. 8,582,203 B2 where, in addition to a first objective facing the sample (corresponding to the objective 102 in FIG. 1) and a second objective facing an intermediate image space (corresponding to the objective 132 in FIG. 1), a third objective (not required in FIG. 1) is arranged at an oblique angle relative to the second objective. In contrast, FIG. 3 is a diagram showing the relationship between the illumination and detection angles and an effective detection aperture in the OPM configuration of FIG. 1 in which the objective 132 and the reflecting element 134 interact with each other in order to dispense with the third objective of the conventional OPM scheme. In this respect, it is to be noted that the following explanation referring to FIG. 3 can also be applied to the objective 142 and the reflecting element 144 shown in FIG. 1.

In the diagram of FIG. 2 illustrating the conventional OPM configuration, a dashed line IA designates an illumination axis, a solid (vertical) axis O designates an optical axis of the second objective (being coincident with the optical axis of the single objective facing the sample), a dash-dotted line D3 designates a detection axis coincident with an optical axis O3 of the oblique third objective, a circular arc EP-O2 designates a pupil of the second objective, and a hatched circular arc EP-O3 designates an effective exit pupil of the third objective, said effective exit pupil representing the effective detection aperture of the conventional OPM configuration.

Figure 3:
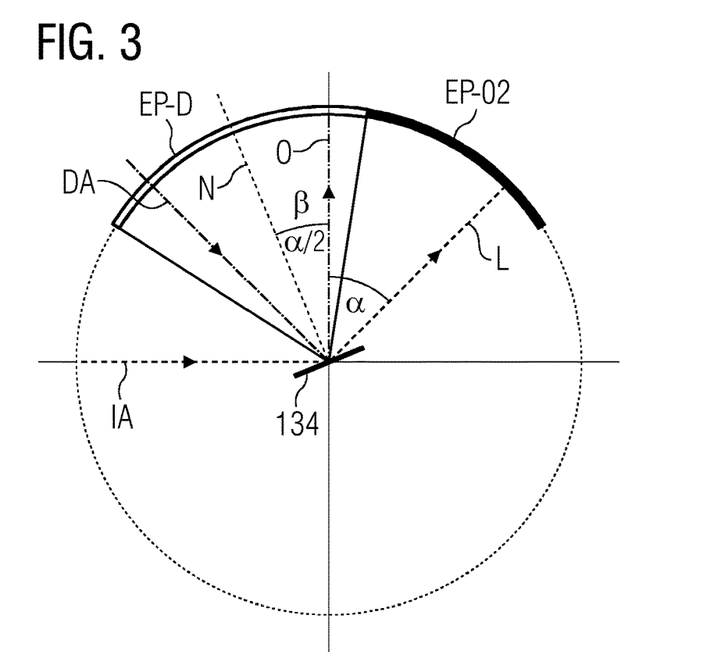
FIG. 3 is a schematic diagram illustrating an enlargement of a detection aperture achieved by the configuration shown in FIG. 1.

In the diagram of FIG. 3 illustrating the novel OPM configuration shown in FIG. 1, the dashed line IA designates the illumination axis, the solid (vertical) line O designates the optical axis of the objective 132 (being coincident with the optical axis of the single objective 102 facing the sample 104), a dash-dotted line DA designates a detection axis, the circular arc EP-O2 designates a pupil of the objective 132 corresponding to the second objective mentioned above with reference to FIG. 2, and a hatched circular arc EP-D designates an effective exit pupil representing the effective detection aperture.

As illustrated in FIG. 3, an angle β between a normal axis N perpendicular to the reflecting element 134 and the optical axis O of the objective 132 equals half of an angle α between the light sheet illumination designated by arrow L and the optical axis O of the objective 132. Accordingly, the reflecting element 134 may be configured to satisfy the condition β=α/2. Satisfying the aforementioned condition means that the reflecting element 134 is configured to reflect the detection light bundle 114 back into the objective 132 such that an axis perpendicular to the plane 106 illuminated by the light sheet is reflected to be parallel to the optical axis of the objective 132.

A comparison between FIGS. 2 and 3 shows that the novel OPM configuration allows to increase the effective detection aperture EP-D of FIG. 3 in relation to EP-O3 of FIG. 2.

Figure 4:
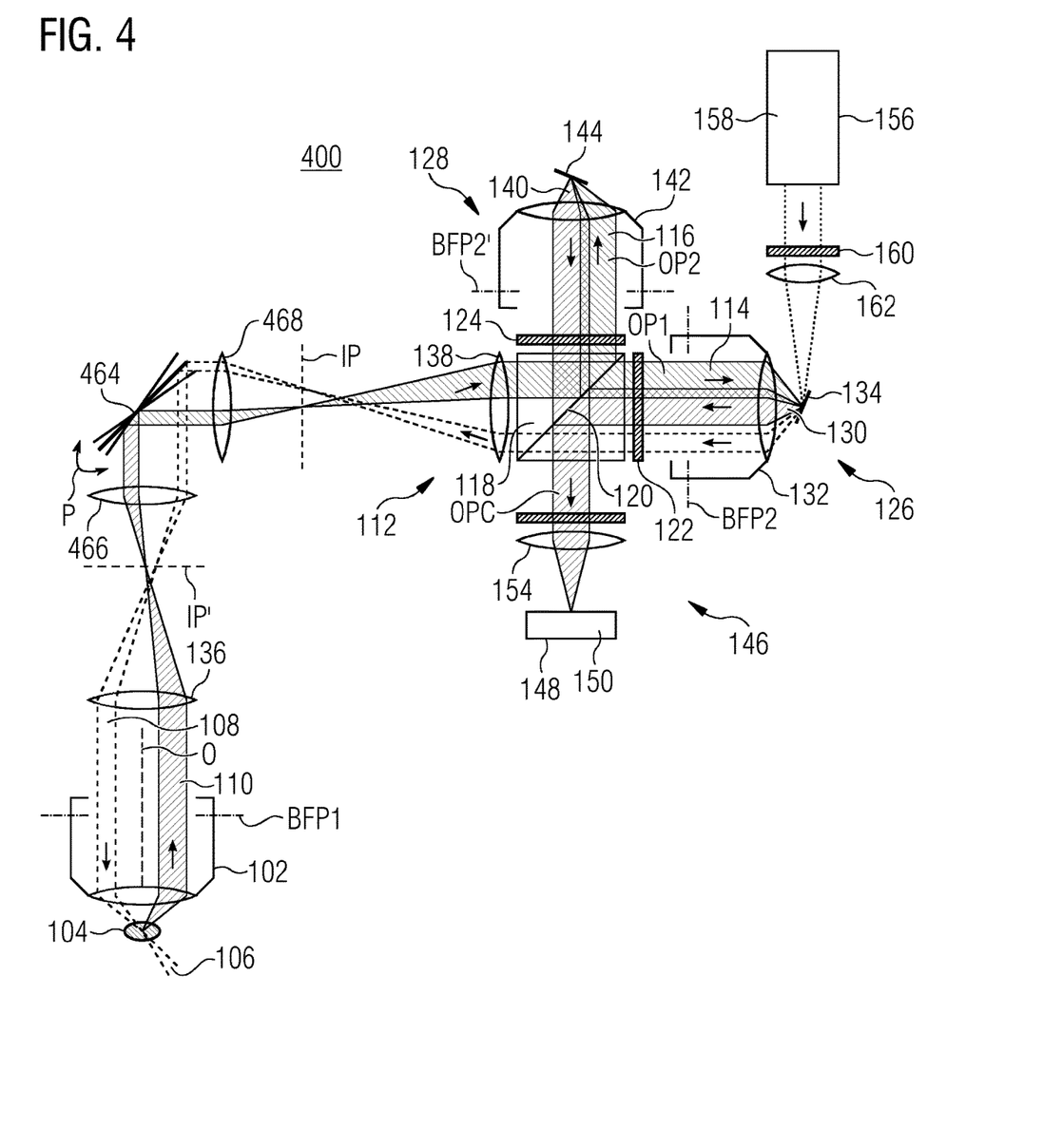
FIG. 4 is a diagram showing a further embodiment of the oblique plane microscope.

FIG. 4 shows an oblique plane microscope 400 according to another embodiment. The oblique plane microscope 400 differs from the embodiment of FIG. 1 in that it allows high-speed 3D imaging in accordance with a SCAPE scheme in which the oblique light sheet is swept through the sample 104.

For this, the oblique plane microscope 400 of FIG. 4 comprises a scanner 464 which is configured to scan the light sheet and a focus plane through the sample 104. In particular, a back focal plane BFP1 of the objective 102 is imaged by means of the tube lens 136 and a first scan lens 466 onto the scanner 464. The image of the back focal plane BFP1, which is formed at the scanner 464, is subsequently imaged by means of a second scan lens 468 and the tube lens 138 into a back focal plane BFP2 of the objective 132 and into a back focal plane BFP2' of the objective 142. As a result, an aberration-free imaging into the intermediate image spaces 130, 140 is achieved.

More specifically, the scanner 466 serves to change the angle of the light sheet in the back focal plane BFP1 in the objective 102 in order to scan the light sheet through the sample 104. For this, the scanner 264 may be tiltable about a tilt axis which is oriented perpendicular to the drawing plane in FIG. 4 as illustrated by a double arrow P. The scanner 264 may be formed by e.g. a galvanometer mirror, a voice-coil mirror or a micro-electromechanical mirror (MEMS). In addition to the intermediate image plane IP in front of the tube lens 138, the oblique plane microscope 400 comprises an intermediate image plane IP' which is located between the tube lens 136 and the scan lens 466.

By using the scanner 464, the embodiment shown in FIG. 4 allows to perform volumetric imaging of the sample 104 without moving the sample 104. As a result, fast volume rates can be achieved.

Figure 5:
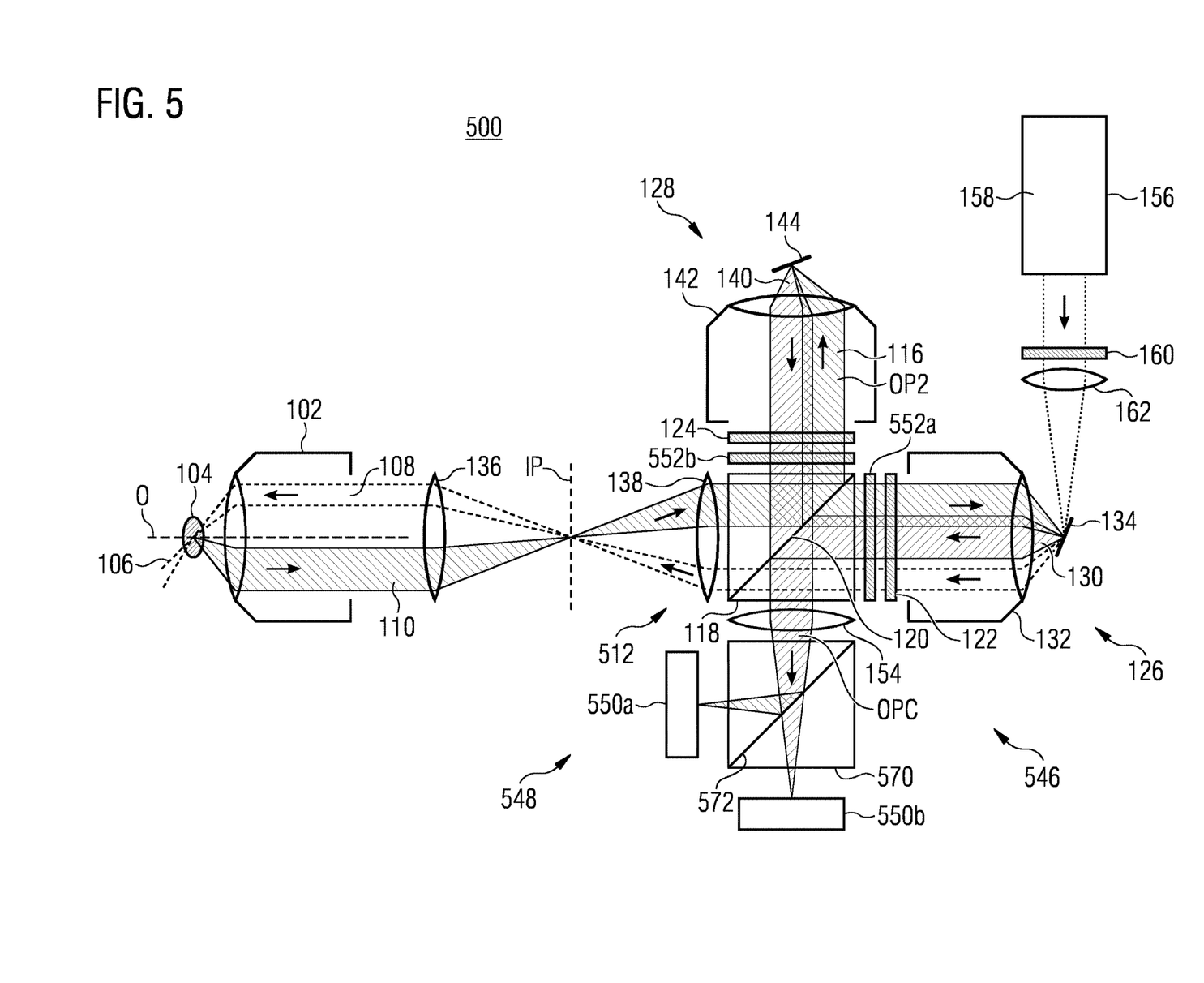
FIG. 5 is a diagram showing a further embodiment of the oblique plane microscope.

FIG. 5 shows an oblique plane microscope 500 according to another embodiment. The oblique plane microscope 500 is a modification which differs from the embodiment shown in FIG. 1 in particular by the number of image sensors used for imaging the sample 104.

The oblique plane microscope 500 comprises a beam splitting system 512 which includes, in addition to the polarizing beam splitter 118, a second beam splitter 570 being part of a detection system 546. The polarizing beam splitter 570 having a beam splitting surface 572 is located in the common detection path OPC which is formed by the polarizing beam splitter 118 which combines the optical paths OP1, OP2 of the first and second detection light bundles 114, 116 reflected back into the first and second objectives 132, and 142, respectively. As shown in FIG. 5, the polarizing beam splitter 570 is configured to separate the first and second detection light bundles 114, 116 which propagate along the common detection path OPC. For this, the polarizing beam splitter 570 makes use of the fact that the detection light bundles 114, 116 propagating along the common detection path OPC already have opposite polarization states. Thus, the first detection light bundle 114, which has been reflected upon returning to the polarizing beam splitter 118, is reflected again at the polarizing beam splitter 570. Likewise, the second detection light bundle 116, which has been transmitted upon returning to the polarizing beam splitter 118, is transmitted again at the polarizing beam splitter 570.

The oblique plane microscope 500 comprises an image sensor system 548 which includes a first image sensor 550a and a second image sensor 550b. The first image sensor 550a is configured to detect the first detection light bundle 114 reflected by the beam splitting surface 572 of the polarizing beam splitter 570. The second image sensor 550b is configured to detect the second detection light bundle 116 transmitted through the beam splitting surface 572 of the polarizing beam splitter 570.

The oblique plane microscope 500 further comprises a first emission filter 552a located in the first optical path OP1 and a second emission filter 552b located in the second optical path OP2. As can be seen in FIG. 5, the first emission filter 552a may be positioned upstream of the quarter-wave plate 122 along the optical path OP1 of the first detection light bundle 114 which passes through the quarter-wave plate 122 for the first time. Likewise, the second emission filter 552b may be positioned upstream of the quarter-wave plate 124 along the optical path OP2 of the second detection light bundle 116 which passes through the quarter-wave plate 124 for the first time. By locating the emission filters 552a, 552b as described above, only a certain wavelength band passes through the respective emission filter 552a, 552b towards the corresponding quarter-wave plate 122, 124. Accordingly, only narrow wavelength bands corresponding to the spectral filter characteristics of the emission filters 552a, 552b must be considered when designing the quarter-wave plates 122, 124. Further, the wavelength bands of the emission filters 552a, 552b may be selected to be different from each other so that simultaneous multi-color imaging may be realized. For instance, a first wavelength band may be detected by the first image sensor 550a, and a second wavelength band differing therefrom may be detected by the second image sensor 550b.

Optionally, an additional filter (not shown in FIG. 5) may be provided on the detector side of the polarizing beam splitter 118 in order to prevent any stray light or reflected illumination light from reaching the image sensor system 548.

Whereas in the embodiment shown in FIG. 1 the first and second detection light bundles 114, 116 are guided onto the single camera 115, the configuration shown in FIG. 5 does not overlap the two detection beams paths on the same camera. Rather, the detection beam paths are spatially separated from each other by the additional polarizing beam splitter 570 and guided onto the image sensors 550a and 550b. As a result, any deterioration due to imperfections in the optical components and manufacturing tolerances can be prevented from occurring since no precise overlap of the two detection beam paths is required.

Figure 6:
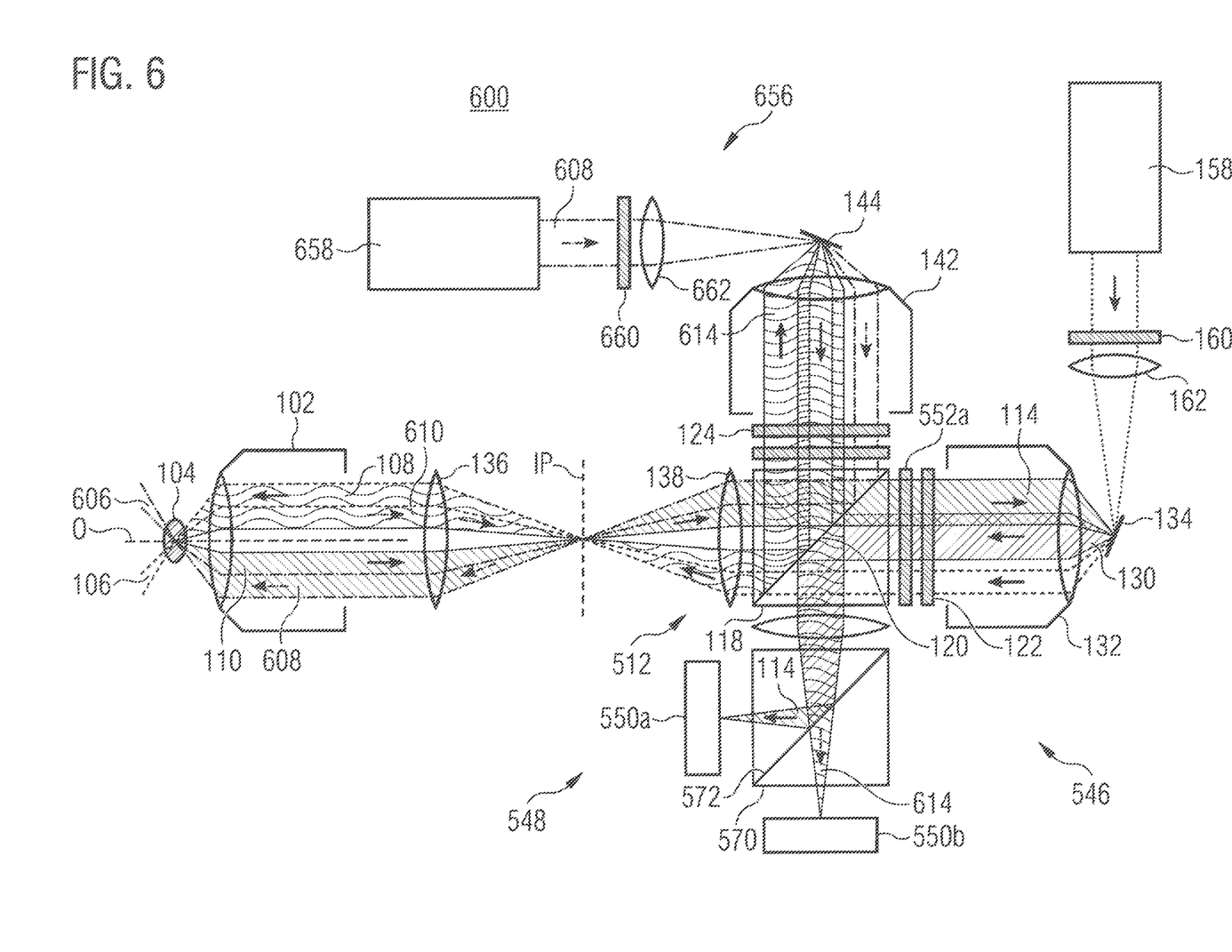
FIG. 6 is a diagram showing a further embodiment of the oblique plane microscope.

FIG. 6 shows an oblique plane microscope 600 according to another embodiment representing a modification which is based on the embodiments shown in FIGS. 1 and 5. The main difference compared to the previous embodiments is that the oblique plane microscope 600 is configured to illuminate the sample 104 with two light sheets from different directions as well as to collect the detection light from different directions.

The oblique plane microscope 600 shown in FIG. 6 comprises an illumination system 656 which includes, in addition to the light source 158, a second light source 658. The illumination system 656 further comprises a quarter-wave plate 660 and a lens 662. The light source 658 emits illumination light 608 which passes through the quarter-wave plate 660 and the lens 662 to be reflected on the second reflecting element 144 into the objective 142. Subsequently, the illumination light 608 coupled into the second objective 142 passes through the quarter-wave plate 124 and is reflected by the splitting surface 120 of the polarizing beam splitter 118. Accordingly, the polarizing state of the illumination light 608 is adjusted by the two quarter-wave plates 660 and 124 such that the illumination light 608 is enabled to be reflected by the splitting surface 120. Subsequently, the illumination light 608 passes through the tube lenses 138, 136 and enters the objective 102 which forms the illumination light 608 into a second light sheet illuminating a plane 606 of the sample 104.

The second reflecting element 144 is configured to couple the illumination light 608 into a decentered sub-area of a pupil of a second objective 142 so that the illumination light 608 enters a decentered sub-area of a pupil of the single objective 102. As a result, the objective 102 is illuminated with the illumination light 608 in a decentered manner, and the second light sheet is tilted relative to the optical axis O of the objective 102 in order to illuminate the oblique plane 606 within the sample 104.

According to the embodiment shown in FIG. 6, the sample 104 may be illuminated within the planes 106 and 606 by two differently inclined light sheets which are generated by two spatially separated illumination light bundles, said light bundles being illustrated in FIG. 6 by dashed lines (with respect to the illumination light 108 emitted by the light source 158) and dash-dotted lines (with respect to the illumination light 608 emitted by the light source 658), respectively.

The oblique plane microscope 600 may be controlled to switch the light sheet illumination between the two light sources 158 and 658. When the light source 158 is switched on, the plane 106 of the sample 104 is illuminated with the light sheet created from the illumination light 108. In this case, the objective 102 collects the detection light 110 from the illuminated plane 106 as illustrated by a hatched detection light bundle in FIG. 6. Subsequently, the detection light 110 enters the polarizing beam splitter 118 which transmits the first detection light bundle 114 towards the first objective 132 and reflects the second detection light bundle 116 towards the second objective 142. The transmitted first detection light bundle 114 is reflected by the first reflecting element 134 back into the first objective 132 and passes through the quarter-wave plate 122. Accordingly, the first detection light bundle 114 is reflected by the polarizing beam splitter 118 towards the beam splitter 570. Then, the beam splitter 570 reflects the first detection light bundle 114 onto the first image sensor 550a.

Likewise, when the light source 658 is switched on, the plane 606 of the sample 104 is illuminated with the light sheet created from the illumination light 608. In this case, the objective 102 collects detection light 610 from the illuminated plane 606 as illustrated by a wavy detection light bundle in FIG. 6. Subsequently, the detection light 610 enters the polarizing beam splitter 118 which reflects a first detection light bundle 614 towards the second objective 142 and transmits a second detection light bundle (not shown in FIG. 6) towards the first objective 132. The detection light bundle 614 is reflected by the second reflecting element 144 back into the second objective 142 and passes through the quarter-wave plate 124. Accordingly, the detection light bundle 614 is transmitted by the polarizing beam splitter 118 towards the beam splitter 570. Then, the beam splitter 570 transmits detection light bundle 114 onto the first image sensor 550a.

As a result, the first and second image sensors 550a, 550b alternately detect images of the illuminated planes 106 and 606, respectively. Accordingly, two different views of the sample 104 can be easily acquired, and no mechanically movement is needed therefor.

The configuration shown in FIG. 6 may also be modified in that two images from different detection views may be captured simultaneously, in particular when different illumination and detection wavelengths are used for the two different directions. Capturing two different views has the advantage that the detection point spread function (PSF) is more isotropic, assumed that the two views are combined. Further, shadow and stripe artefacts can be reduced.

Figure 7:
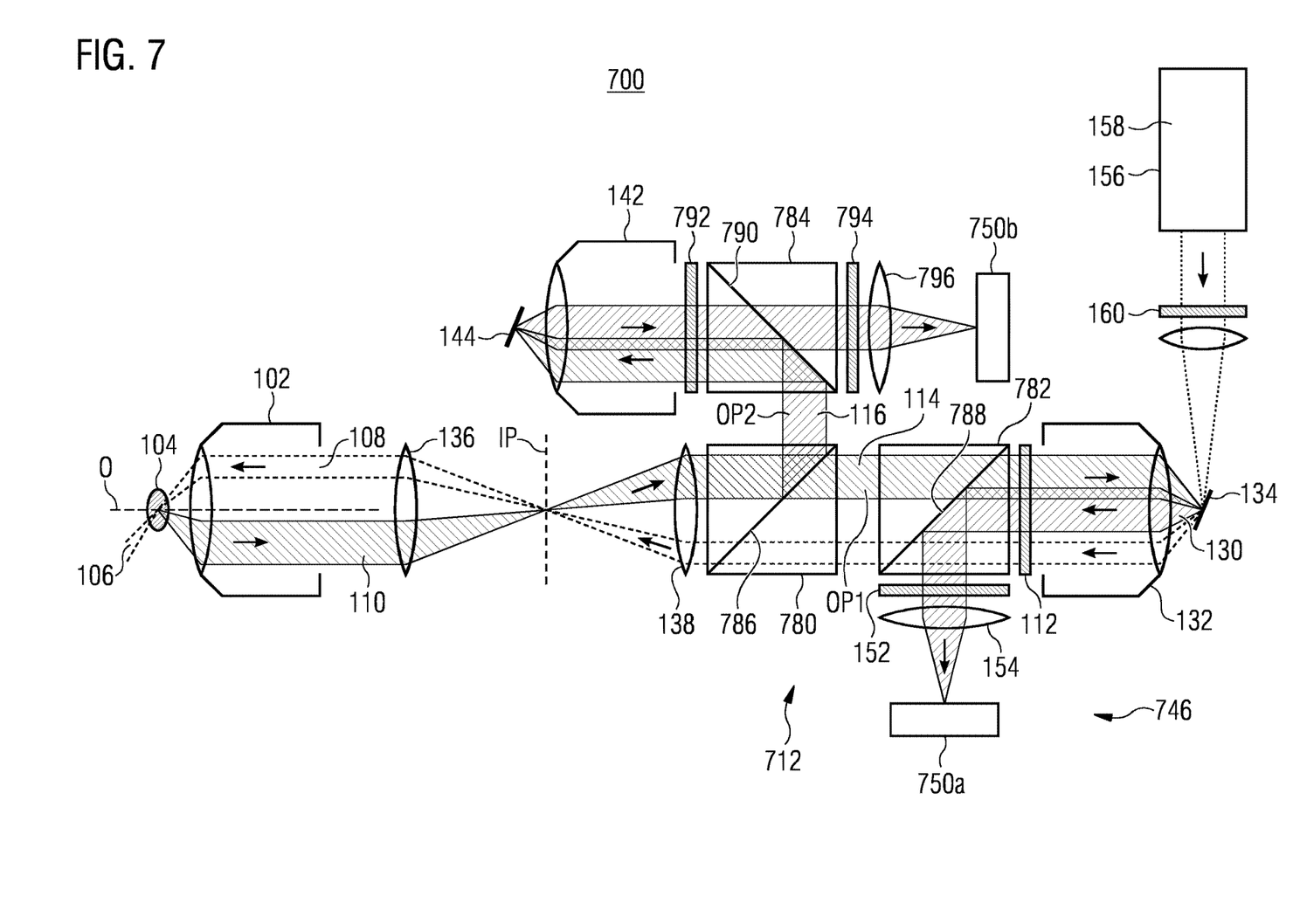
FIG. 7 is a diagram showing a further embodiment of the oblique plane microscope.

FIG. 7 shows an oblique plane microscope 700 according to another embodiment. The main difference of the oblique plane microscope 700 compared to the previous embodiments is a beam splitting system 712 which is configured to separate the optical path OP1 of the first detection light bundle 114 and the second optical OP2 of the second detection light bundle 116 completely.

The beam splitting system 712 of the oblique plane microscope 700 comprises three polarizing beam splitters 780, 782 and 784, each of which having a splitting surface 786, 788, and 790, respectively. The first polarizing beam splitter 780 splits the collected detection light 110 into the first detection light bundle 114 propagating along the optical path OP1 and the second detection light bundle 116 propagating along the optical path OP2 by way of transmission and reflection, respectively. The second polarizing beam splitter 782 transmits the first detection light bundle 114 towards the first objective 132. The second polarizing beam splitter 784 reflects the second detection light bundle 116 towards the second objective 142.

Further, the oblique plane microscope 700 comprises a detection system 746 which includes first and second image sensors 750a, 750b for detecting the first and second detection light bundles 114 and 116, respectively. Specifically, the first detection light bundle 114, which is reflected by the first reflecting element 134 back into the objective 132, passes through the quarter-wave plate 112 and is reflected by the second polarizing beam splitter 782 towards the emission filter 152. After passing through the emission filter 152, the first detection light bundle 114 is converged by the tube lens 154 onto the first image sensor 750a. The second detection light bundle 116 is reflected by the third polarizing beam splitter 784 towards a quarter-wave plate 792 and enters the second objective 142. After being reflected by the second reflecting element 144, the second detection light bundle 116 passes through the quarter-wave plate 792, the second polarizing beam splitter 784, an emission filter 794 and a tube lens 796 in order to be detected by the second image sensor 750b.

By completely separating the two optical paths OP1 and OP2, any detrimental effects due to stray light or an interference between the optical outputs of the beam splitting system can be avoided.

The embodiments described above are to be understood merely as examples. In particular, it is to be emphasized that the features of the different embodiments can be suitably combined. In other words, the proposed solution shall not be limited to any specific configuration as shown in each of the FIGS. 1 to 7. By way of example, a multi-view setup as shown in FIG. 6 may also utilize a scanning setup for implementing a SCAPE configuration as illustrated in FIG. 4.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

LIST OF REFERENCE SIGNS 100 oblique plane microscope
102 objective
104 sample
106 plane
108 illumination light 110 detection light
112 beam splitting system
114 first detection light bundle
116 second detection light bundle
118 polarizing beam splitter
120 splitting surface
122 first quarter-wave plate
124 second quarter-wave plate
126 first intermediate imaging system
128 second intermediate imaging system
130 first intermediate image space
132 first objective
134 first reflecting element
136, 138 tube lenses
140 second intermediate image space
142 second objective
144 second reflecting element
146 detection system
148 image sensor system
150 image sensor
152 emission filter
154 tube lens
156 illumination system
158 light source
160 quarter-wave plate
162 lens
400 oblique plane microscope
464 scanner
466 scan lens
468 scan lens
500 oblique plane microscope
512 beam spitting system
546 detection system
548 image sensor system
550a, 550b image sensor
550a first image sensor
550b second image sensor
552a emission filter
552b emission filter
570 polarizing beam splitter
572 beam splitting surface
600 oblique plane microscope
606 plane
608 illumination light
656 illumination system
658 light source
660 quarter-wave plate
662 lens
700 oblique plane microscope
712 beam splitting system
746 detection system
750a, 750b image sensor
780, 782, 784 polarizing beam splitter
786, 788, 790 beam splitting surface
792 quarter-wave plate
794 emission filter
796 tube lens
O, O3 optical axis
OP1, OP2 optical paths
OPC common optical path
IP, IP' intermediate image plane
IA illumination axis
D3, DA detection axis
EP-O2, EP-O3, EP-D pupil
L light sheet illumination
N normal axis
α, β angle

What is claimed is:

1. An oblique plane microscope for imaging a sample, the oblique plane microscope comprising:
a single objective configured to illuminate a plane of the sample with a light sheet and to collect detection light from an illuminated plane;
a beam splitting system configured to split collected detection light into a first detection light bundle propagating along a first optical path (OP1) and a second detection light bundle propagating along a second optical path (OP2);
a first intermediate imaging system configured to generate a first intermediate image of the illuminated plane from the first detection light bundle in a first intermediate image space, said first intermediate imaging system comprising a first objective and a first reflecting element, the first reflecting element being positioned in the first intermediate image space and configured to reflect the first detection light bundle back into the first objective;
a second intermediate imaging system configured to generate a second intermediate image of the illuminated plane from the second detection light bundle in a second intermediate image space, said second intermediate imaging system comprising a second objective and a second reflecting element, the second reflecting element being positioned in the second intermediate image space and configured to reflect the second detection light bundle back into the second objective;
a detection system configured to detect the first and the second detection light bundles reflected back into the first and the second objectives, respectively, for imaging the sample; and
an illumination system configured to emit illumination light onto at least one of the first and the second reflecting elements for coupling the illumination light into at least one of the first and the second objectives.

2. The oblique plane microscope according to claim 1, wherein the first reflecting element is configured to reflect the first detection light bundle back into the first objective such that the first detection light bundle as reflected is re-centered within a pupil plane of the first objective and wherein the second reflecting element is configured to reflect the second light detection bundle back into the second objective such that the second detection light bundle as reflected is re-centered within a pupil plane of the second objective.

3. The oblique plane microscope according to claim 1, wherein the beam splitting system is configured to partially overlap the first optical path (OP1) of the first light detection bundle and the second optical path (0P2) of the second detection light bundle into a common detection path (OPC), and wherein the detection system comprises an image sensor system configured to detect the first and the second detection light bundles which are reflected back into the first and the second objectives, respectively, and propagate along said common detection path (OPC).

4. The oblique plane microscope according to claim 3, wherein the image sensor system comprises a single image sensor positioned in said common detection path and configured to detect both the first detection light bundle and the second detection light bundle.

5. The oblique plane microscope according to claim 3, wherein the beam splitting system is configured to separate the first detection light bundle and the second detection light bundle propagating along the common detection path (OPC), and wherein the image sensor system comprises a first image sensor configured to detect the first detection light bundle and a second image sensor configured to detect the second detection light bundle.

6. The oblique plane microscope according to claim 1, wherein the beam splitting system is configured to completely separate the first optical path (OP1) of the first detection light bundle and the second optical path (OP2) of the second detection light bundle, wherein the detection system comprises a first image sensor configured to detect the first detection light bundle which is reflected back into the first objective and propagates along the first optical path (OP1), and wherein the detection system comprises a second image sensor configured to detect the second detection light bundle which is reflected back into the second objective and propagates along the second optical path (OP2).

7. The oblique plane microscope according to claim 1, comprising a scanner configured to scan the light sheet and a focus plane through the sample.

8. The oblique plane microscope according claim 1, wherein at least one of the first and the second reflecting elements is configured to couple the illumination into a decentered sub-area of a pupil of the associated objective so that the illumination light enters the decentered sub-area of the pupil of the single objective which illuminates the sample with the light sheet.

9. The oblique plane microscope according to claim 8, wherein the single objective illuminates the sample with two light sheets from different directions.

10. The oblique plane microscope according to claim 9, wherein the first and the second reflecting elements are configured to reflect the first and the second detection light bundles into different directions corresponding to the different illumination directions.

11. The oblique plane microscope according claim 1, wherein the beam splitting system comprises at least one polarizing beam splitter configured to split the detection light into a first detection light component having a first polarization state and a second detection light component having a second polarization states.

12. The oblique plane microscope according to claim 11, wherein the beam splitting system comprises at least one wave plate associated with said at least one polarizing beam splitter, said at least one wave plate being configured to be transmitted by at least one of said first and said second detection light components twice in opposite light propagation directions thereby altering the polarization state of the at least one of said first and said second detection light components from one of the first and the second polarization states into another of the first and the second polarization states.

13. The oblique plane microscope according to claim 12, wherein the first and the second polarization states are linear polarization states orthogonal to each other, and wherein the at least one wave plate is configured to retard the detection light component by a quarter of a wavelength.

14. The oblique plane microscope according to claim 12, further comprising at least one emission filter configured to block illumination light reflected by the sample, said emission filter being positioned upstream of the wave plate along an optical path of the detection light component passing through the wave plate for the first time.

15. The oblique plane microscope according to claim 1, wherein the illuminated plane is oblique to an optical axis (O) of the single objective facing the sample, the first intermediate image is oblique to an optical axis of the first objective, and the second intermediate image is oblique to an optical axis of the second objective.

* * * * *